United States Patent
Hicks et al.

(10) Patent No.: US 9,367,208 B2
(45) Date of Patent: Jun. 14, 2016

(54) MOVE ICON TO REVEAL TEXTUAL INFORMATION

(71) Applicant: BARNES & NOBLE COLLEGE BOOKSELLERS, LLC, Basking Ridge, NJ (US)

(72) Inventors: Kourtny M. Hicks, Sunnyvale, CA (US); Amir Mesguich Havilio, Palo Alto, CA (US)

(73) Assignee: BARNES & NOBLE COLLEGE BOOKSELLERS, LLC, Basking Ridge, NJ (US)

(*) Notice: Subject to any disclaimer, the term of this patent is extended or adjusted under 35 U.S.C. 154(b) by 89 days.

(21) Appl. No.: 14/144,895

(22) Filed: Dec. 31, 2013

(65) Prior Publication Data

US 2015/0186008 A1 Jul. 2, 2015

(51) Int. Cl.
*G06F 3/0481* (2013.01)
*G06F 3/0482* (2013.01)
*G06F 3/0484* (2013.01)
*G06F 3/0488* (2013.01)

(52) U.S. Cl.
CPC .......... *G06F 3/04817* (2013.01); *G06F 3/0481* (2013.01); *G06F 3/0482* (2013.01); *G06F 3/04845* (2013.01); *G06F 3/04883* (2013.01)

(58) Field of Classification Search
CPC .............. G06F 3/0481; G06F 3/04845; G06F 3/04817; G06F 3/04883; G06F 3/0482
See application file for complete search history.

(56) References Cited

U.S. PATENT DOCUMENTS

| 4,896,543 | A | | 1/1990 | Gullman |
| 5,303,388 | A | * | 4/1994 | Kreitman et al. ............. 715/836 |
| 5,633,471 | A | | 5/1997 | Fukushima |
| 5,844,557 | A | | 12/1998 | Shively, II |
| 6,259,438 | B1 | | 7/2001 | Fleck et al. |
| 6,334,157 | B1 | | 12/2001 | Oppermann et al. |

(Continued)

FOREIGN PATENT DOCUMENTS

| EP | 0722150 A1 | | 7/1996 | |
| WO | WO 2014/100948 | * | 7/2014 | ............. G06F 15/16 |

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; printed from the Internet on Jun. 20, 2013, 6 pages.

(Continued)

*Primary Examiner* — Aaron Lowenberger
(74) *Attorney, Agent, or Firm* — Finch & Maloney PLLC

(57) ABSTRACT

Techniques are disclosed for providing a content information viewing mode in electronic devices. In an embodiment, in response to a gesture performed on an electronic touch sensitive device, a content icon may be moved from its original location and information about that item of digital content may be displayed to the user. The information may be displayed on the portion of the screen previously occupied by the content icon. Releasing contact with the touch screen allows the icon to return to its original location. Moving the content icon past a certain point, may allow the user to edit the newly displayed content information. An audio and/or visual indicator may be output by the electronic device alerting the user that the newly visible information may now be edited. Movement that extends further may indicate that icon movement is desired, not the information viewing/editing mode.

20 Claims, 10 Drawing Sheets

(56) References Cited

U.S. PATENT DOCUMENTS

| | | | |
|---|---|---|---|
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2007/0047002 A1 | 3/2007 | Hull et al. | |
| 2007/0157089 A1* | 7/2007 | Van Os | G06F 3/04817 715/702 |
| 2008/0036747 A1 | 2/2008 | Hope | |
| 2008/0141108 A1* | 6/2008 | Matsuura | 715/202 |
| 2010/0100854 A1 | 4/2010 | Russell et al. | |
| 2010/0146384 A1* | 6/2010 | Peev et al. | 715/255 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0258542 A1 | 10/2011 | Kenney et al. | |
| 2011/0258582 A1* | 10/2011 | Bang | 715/811 |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0067335 A1* | 3/2013 | Hartweg | 715/730 |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |

OTHER PUBLICATIONS

Volpe, Joseph, Amazon patents intelligent pen for adding annotations to digital and printed media (updated), http://www.engadget.com/2012/03/06/amazon-patents-intelligent-pen/, posted Mar. 6, 2012 at 5:39 PM, 3 pages.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, published Feb. 28, 2013, 13 pages.

"Bamboo Stylus," Wacom Americas, http://www.wacom.com/en/products/stylus, printed from the Internet on Jun. 20, 2013, 5 pages.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, printed from the Internet on Aug. 2, 2013, 1 page.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-Sep. 10, 2004, 10 pages.

"Pen," DuoSense Pen, N-trig Hands-on computing, http://www.n-trig.com/Content.aspx?Page=DigitalPencil, printed from the Internet on Jun. 20, 2013, 3 pages.

"Easing functions," Easing Functions Cheat Sheet, http://easings.net/, printed from the Internet on Jun. 17, 2013, 3 pages.

Kirupa, Easing Functions (aka Timing Functions) in CSS3, http://www.kirupa.com/html5/easing_functions_css3.htm, published Apr. 3, 2013, 16 pages.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, printed from the Internet on Aug. 2, 2013, 5 pages.

"Simultaneous Pen & Touch: The Natural Way to Work," Perceptive Pixel Active Stylus, www.perceptivepixel.com/_literature_136086/Active_Stylus, printed from the Internet on Dec. 14, 2012, 2 pages.

"Future Apple Notebooks & Tablets may use Acoustic Commands—Patently Apple," http://www.patentlyapple.com/patently-apple/2011/02/future-apple-notebooks-tablets-may-use-acoustic-commands.html, published Feb. 18, 2011, 6 pages.

"Guidelines for selecting text and images (Windows Store apps)," http://msdn.microsoft.com/en-us/library/windows/apps/hh465334, printed from the Internet on Jun. 20, 2013, 5 pages.

Lutz, Zachary, "Hands-on with wireless, ultrasonic stylus an touchless gestures at MWC (video)," http://www.engadget.com/2012/03/01/hands-on-with-wireless-ultrasonic-stylus-and-touchless-gestures/, posted Mar. 1, 2012 at 8:28 AM, 3 pages.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, printed from the Internet on Jun. 20, 2013, 6 pages.

"How do WACOM tablets work?," tablet4u.co.uk, http://www.tablet4u.co.uk/techinfo.html, printed from the Internet on Jun. 20, 2013, 2 pages.

Kim, Arnold, "Multi-Touch Page Flipping eBook Concept Shown on an iPad," http://www.macrumors.com/2012/01/23/multi-touch-page-flipping-ebook-concept-shown-on-an-ipad/, posted Jan. 22, 2012 at 10:52 PM, 6 pages.

"Desktop Touchscreens,"—Desktop touchscreens explained, http://www.touchscreenmagazine.nl/touchscreen-solutions/desktop-touchscreens, printed from the Internet on Nov. 3, 2012, 1 page.

"MTStylus Wireless Stereo Stylus for iPhone/Andriod Phone & Tablet," dexim-MTStylus Wireless Stereo Stylus, http://www.dexim.net/content.php?id=165&pid=11, printed from the Internet on Jun. 20, 2013, 2 pages.

"Padblue 2," BRANDO—mobile.brando.com, http://mobile.brando.com/Padblue-2_p9162c1577d94.html., printed from the Internet on May 10, 2013, 4 pages.

Fingas, Jon, "Panasonic mobile devices to use Anoto's pattern-based pen input technology," http://www.engadget.com/2013/01/08/panasonic-mobile-devices-to-use-anoto-pattern-pen-input/, posted Jan. 8, 2013 at 1:00 PM, 4 pages.

"Bluetooth 4.0 SmartPen the future just got a little brighter," Pogo Connect, http://tenonedesign.com/connect.php, printed from the Internet on Jun. 20, 2013, 7 pages.

Quick, Darren, "Pressure sensitive technology set to bring 3D capability to touchscreens," Mobile Technology, http://www.gizmag.com/new-touchscreen-technology, published on Jan. 31, 2010, 4 pages.

Rigg, Jamie, "Sony tries to patent stylus with friction-based haptic feedback," http://www.engadget.com/2012/11/22/sony-haptic-feedback-stylus-patent/, posted on Nov. 22, 2012 at 9:50 AM, 2 pages.

"Stylus Hanging Bluetooth Headset," BRANDO—mobile.brando.com, http://mobile.brando.com/prod_detail.php?prod_id=03291, printed from the Internet on May 10, 2013, 4 pages.

"The JukeStyle is a great budget stylus for your iOS devices," stylus Archives—iPad News, http://www.ipadnews.nl/tag/stylus/, printed from the Internet on Jun. 20, 2013, 44 pages.

(56) References Cited

OTHER PUBLICATIONS

Lavrinc, Damon, "Why Flipping Through Paper-Like Pages Endures in the Digital World," Gadget Lab, http://www.wired.com/gadgetlab/2012/05/why-flipping-through-paper-like-pages-endures-in-the-digital-world/, posted on May 11, 2012 at 3:48 PM, 5 pages.
Bragdon, et al., "Experimental Analysis of Touch-Screen Gesture Designs in Mobile Environments", CHI 2011—Session: Gestures, May 7-12, 2011, Vancouver, BC, Canada. Copyright 2011 ACM 978-1-4503-0267-Aug. 11, 2005, pp. 403-412.
"Gesture Search for Google Mobile", Google Mobile, www.google.com/mobile/gesture-search, printed from the Internet on Dec. 26, 2012, 1 page.
"Comics by comiXology," Comic Book Reader Guide, http://www.comicbookreaderguide.com/comics-by-comixology/, printed from the Internet on May 6, 2013, 24 pages.
"NFC Forum: Frequently Asked Questions," http://www.nfc-forum.org/resources/faqs#acknowledge, printed from the Internet on Feb. 18, 2013, 11 pages.
"How to Remote Wipe an iPhone or iPad," OSXDaily, http://osxdaily.com/2012/06/05/remote-wipe-iphone-or-ipad/, published Jun. 5, 2012, 4 pages.
"Screen hotspot," Wikipedia, the free encyclopedia, http://en.wikipedia.org/wiki/Screen_hotspot, printed from the Internet on May 15, 2013, 1 page.
"PAiA-Touch Switches," copyright 2006 PAiA Corporation USA, http://www.paia.com/ProdArticles/touchsw.html, printed from the Internet on Aug. 27, 2013, 3 pages.
Kanai, et al., "Intra-Rendition Navigation," Copyright 2012-2013 International Digital Publishing Forum (IDPF), 13 pages.
"explaining how the sPen tech works (and is very diff than other styluses)," http://forum.xda-developers.com/showthread.php?t=1439369, posted Jan. 11, 2012, 8:20 AM, 1 page.
"Navigation Drawer," http://developer.android.com/design/patterns/navigation-drawer.html, downloaded from the internet on Dec. 20, 2013, 14 pages.

\* cited by examiner

MOVE ICON TO REVEAL TEXTUAL INFORMATION

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, one or more eBooks, images, video or music files, document files, an online article or blog, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figures 1A, 1B:
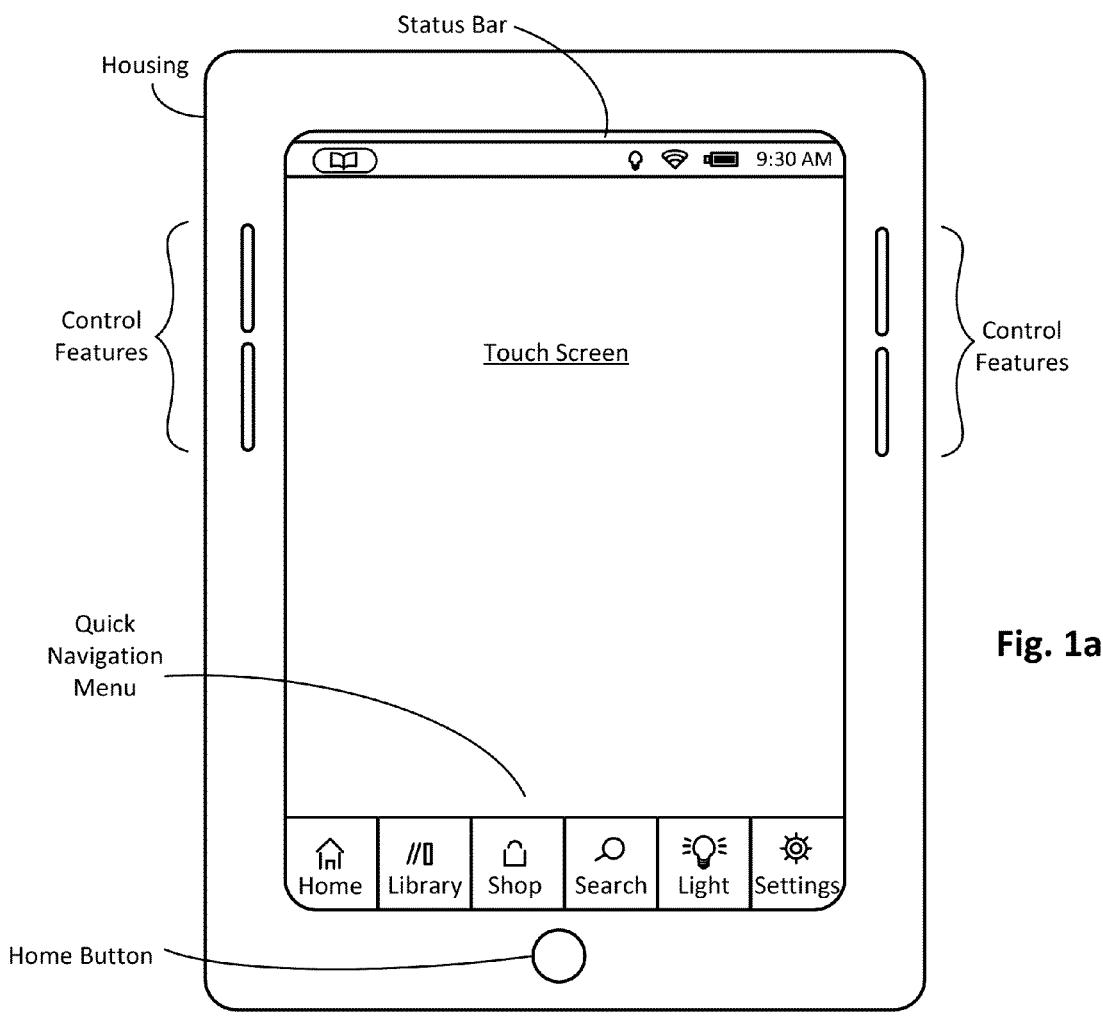
FIGS. 1a-b illustrate an example electronic touch screen device having a content information viewing mode configured in accordance with an embodiment of the present invention.

Techniques are disclosed for providing a content information viewing mode in electronic computing devices, such as a touch screen device. The user can engage the content information viewing mode with an information viewing command, which may be, for example, a single-contact swipe gesture performed on a touch sensitive display, in some embodiments. In one embodiment, the information viewing gesture displaces a content icon representing an item of digital content, and information about that item of digital content may be displayed to the user. The information may be displayed, for example, on the portion of the screen previously occupied by the content icon, or adjacent to the content icon. Moving the content icon may cause adjacent content icons to be displaced or otherwise readjusted on the touch screen display, in some embodiments. If the user releases contact with the touch screen, the icon may return to its original location and the content information is no longer visible. In such an example, performing a quick swipe gesture over a content icon allows the user to briefly preview information about that item of digital content. In one example, the amount of content information that is displayed to the user depends on how much the content icon is moved from its original location. Moving the content icon past a certain point, for example, halfway outside of its original footprint, may engage an edit mode that allows the user to edit the newly-displayed content information. In some embodiments, an audio and/or visual indicator may be output by the electronic device alerting the user that the newly visible information may now be edited.

General Overview

As previously explained, electronic display devices such as tablets, eReaders, and smart phones are commonly used for displaying user interfaces and consumable content. The user of such devices can typically consume the displayed content with relative ease. In some instances, the user may wish to view information about various digital content items and/or edit such information. While general functions suitable for viewing the properties and information related to digital content may be available in some electronic devices, a content information viewing mode as described herein may provide a more intuitive or otherwise positive user experience.

Thus, and in accordance with an embodiment of the present invention, content information viewing techniques are disclosed for use in electronic touch screen devices. A content information viewing mode allows a user to view, and in some instances edit, information related to digital content items. In some embodiments, the user can engage the content information viewing mode by performing an information viewing gesture. For instance, the user may perform such a gesture on the touch screen display to move a content icon, thus revealing content information that was previously not visible to the user. The newly revealed content information may be displayed, for example, on the area of the screen previously occupied by the content icon before the icon was moved. In some embodiments, the user may perform a swipe gesture (or other suitable information viewing gesture or command) above a content icon to move the icon, and the amount of information displayed to the user may depend on how much the content icon is moved. For example, a short swipe gesture may slightly move the content icon, only revealing the item's title, while a longer swipe gesture may reveal the title, file type, file size, etc. By releasing the user contact from the touch sensitive display, the content icon may return to its original position, again obscuring the content information, in some embodiments. In such an example, a quick swipe gesture performed over a content icon allows the user to briefly preview information about that piece of content. In some embodiments, various digital content icons may be displayed close together on the touch screen display, and therefore moving one content icon to reveal content information may cause adjacent content icons to be displaced or otherwise adjusted on the display screen. In another embodiment, the moved icon may temporarily overlay the neighboring icon.

In some embodiments, a swipe gesture that sufficiently moves the content icon may activate an information editing function allowing the user to edit the newly visible content information. In such embodiments, the information editing gesture may merely be an extended version of the information viewing gesture, such as a continuous swipe that moves the target icon completely off its original position. In other embodiments, a separate information editing gesture may be performed to view and edit content information. For instance, the information viewing gesture can be a one-finger swipe, and the information editing gesture can be a two-finger swipe.

In one specific embodiment, the information viewing gesture is a single-contact swipe gesture performed over a file icon, folder icon, or other icon representing a piece of digital content, which moves the digital content icon and reveals content information. As mentioned above, an information editing gesture may be a continuation or extended version of the information viewing gesture that sufficiently moves a content icon. For example, in one such embodiment, moving a content icon past, the midway point of the icon's original footprint activates an information editing function that allows the user to edit content information. In another embodiment, the information editing function is activated when a content icon is fully moved from the footprint of its original position on the display screen. In other embodiments, a distinct touch screen gesture may be configured as the information editing gesture (e.g., two-finger swipe or a triple tap on the target icon). The content information viewing/editing mode may also include, in some embodiments, an editing indicator intended to alert the user when the icon has been sufficiently moved to activate the information editing function. For instance, the editing indicator may include, a click or locking noise, a locking graphic, a haptic feedback signal, an animation including graphics and/or text, or any other sound or video effect used to indicate that the information editing feature of the content information viewing mode has been activated.

In some embodiments, the swipe gestures described herein may include more than one contact point, as will be appreciated in light of this disclosure. As used herein, a swipe gesture may include a sweeping or dragging gesture across at least a portion of the touch sensitive surface; whether directly contacting that surface or hovering over that surface (e.g., within a few centimeters or otherwise close enough to be detected by the touch sensitive surface). In some embodiments, the swipe gesture may be performed at a constant speed in one single direction, while in other embodiments the swipe gesture may follow a curved path or otherwise non-straight path. The gestures can be performed, for example, with the tip of a finger or a stylus, or any other suitable implement capable of providing a detectable swipe gesture. Given the global nature and/or uniqueness of the engagement mechanism, in accordance with some example embodiments, the content information viewing mode can be similarly invoked within multiple diverse applications (e.g., document viewer, browser, picture viewer, etc.) and without conflicting with other global gestures that might also be used by the device's operating system.

Various types of digital content can benefit from the content information viewing mode described herein. For example, the digital content may include a digital catalogue, magazine, comics, eBook, text document, graphic, image, audio or video file, and/or other digital content that may be accessed through the UI of a digital computing device. In some embodiments, the digital content may be displayed to the user as a thumbnail image, a file icon, or a folder icon and may be accompanied by a textual description of the content (e.g., file name, folder name, file type, date of last modification, file size, etc.). For purposes of this disclosure, all such graphical representations of a content item are generally referred to as "icons." In one embodiment, the techniques described herein may be used to display to the user the number of annotations (e.g., bookmarks, flags, highlights, or notes) associated with the digital content. In other embodiments, the content information viewing mode may display a user's current or predicted grade in a course, whether new content is available for download/purchase for that course or eBook, whether a new reading assignment has been assigned, whether the user has been sent a message relating to the digital content, whether an assignment or test has been scheduled, or any other data or metadata related to the relevant piece of content. Such data may include a book title, file name, author name, artist name, album name, number of annotations, grade, new content notification, new message, upcoming event notification, album art, thumbnail image, file type, folder name, number of files saved within a folder, UPC, EAN, and/or international product or article identifier, just to name a few examples.

Architecture

FIGS. 1$a$-$b$ illustrate an example electronic touch sensitive device having a content information viewing mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device (such as a content information viewing mode), or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
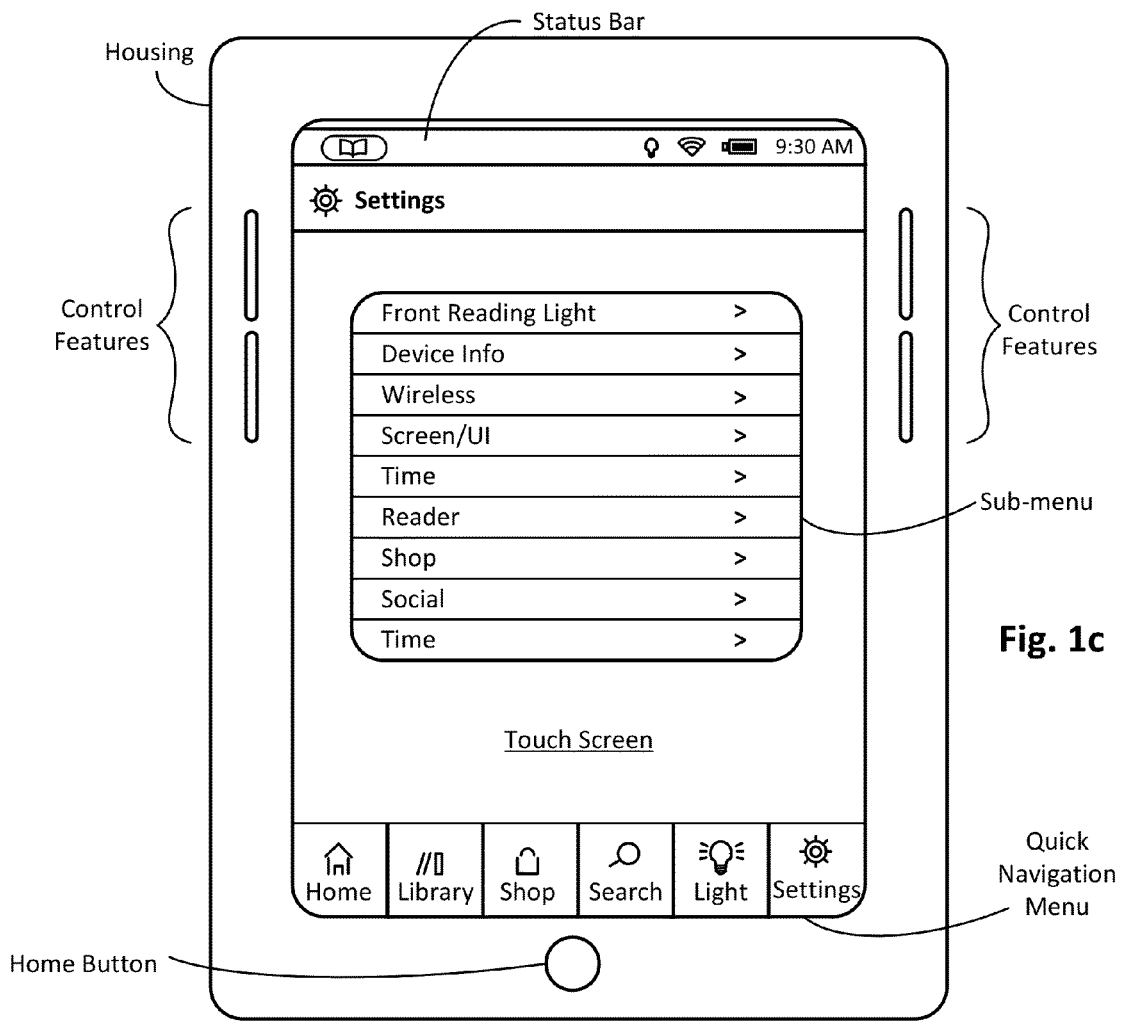
FIGS. 1c-d illustrate example configuration screen shots of the user interface of the electronic touch screen device shown in FIGS. 1a-b, configured in accordance with an embodiment of the present invention.
Figure 1D:
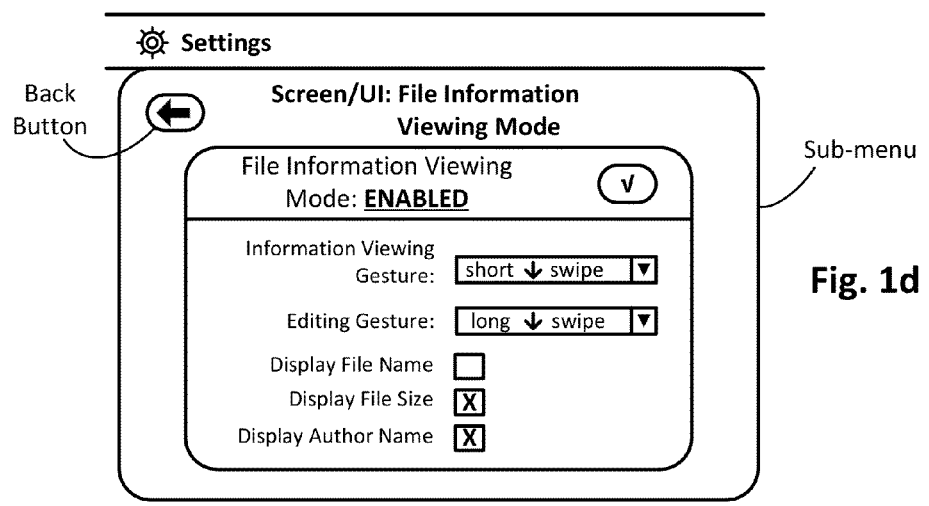

In one particular embodiment, a content information viewing mode configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu option may cause the configuration sub-menu of FIG. 1d to be displayed, in accordance with an embodiment. In other example embodiments, selecting the Screen/UI option may present the user with a number of additional sub-options, one of which may include a so-called "content information viewing mode" option, which may then be selected by the user so as to cause the content information viewing mode configuration sub-menu of FIG. 1d to be displayed. Any number of such menu schemes and nested hierarchies can be used, as will be appreciated in light of this disclosure. In other example embodiments, the content information viewing mode is hard-coded such that no configuration sub-menus are needed or otherwise provided (e.g., performing a swipe gesture to reveal content information as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the content information viewing mode configuration sub-menu shown in FIG. 1d can be provided to the user, in accordance with one such example embodiment. The user can configure a number of features with respect to the content information viewing mode, in this example case. For instance, the configuration sub-menu includes a UI check box that when checked or otherwise selected by the user, effectively enables the content information viewing mode (shown in the enabled state); unchecking the box disables the function. Other embodiments may have the content information viewing mode always enabled, or enabled by a physical switch or button located on the device, for example. As previously explained, the content information viewing mode may be associated with an information viewing gesture and an information editing gesture. In such embodiments, the information viewing gesture allows the user to view content information that was previously not visible (e.g., by moving the content icon), while the information editing gesture allows the user to edit the newly visible content information.

In some embodiments, the user may configure the information viewing gesture and/or the information editing gesture, and in this particular embodiment, the user has selected a short downward swipe gesture as the information viewing gesture and a longer downward swipe gesture as the information editing gesture, each performed over a desired content icon. In such an embodiment, the information editing gesture is essentially a continuation of the information viewing gesture. Other embodiments may use different gestures, such as a two-contact drag gesture, a circle gesture, a distinguishable tap gesture, or any other recognizable gesture that can be used to distinctly indicate that the content information viewing mode is desired (e.g., an upward drag gesture for engaging the information viewing mode and a downward drag gesture for engaging the information editing mode). As can be seen in this example, the desired gestures have been selected from drop-down menus, but any suitable UI selection mechanisms can be used. In still other embodiments, note that a touch screen gesture is not necessarily required. For instance, in a desktop computing application having a non-touch display and a mouse, the information viewing and/or editing gesture can be the user dragging the cursor (e.g., via a click-and-hold mouse-based drag). In a more general sense, any suitable user input techniques can be used to interact with the content information viewing mode provided herein. For ease of description, examples provided herein focus on touch screen technology.

With further reference to the example embodiment of FIG. 1d, the user has the option to select which types of content information will be revealed and edited when the content information viewing mode is invoked. In the example shown, the available types of content information include the file name, file size, and/or the file author's name. In a more general sense, any information that is descriptive and/or otherwise associated with the target digital content item can be included in the so-called content information. As can be seen in the example shown in FIG. 1d, touch screen UI check boxes have been used to select file size and author name as the two types of content information displayed by the content information viewing mode. As mentioned above, many other types of information may be displayed and/or edited using the file information viewing mode, and the information types displayed in this example figure are not intended to limit the disclosure to any particular type of content information.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an example of how a content information viewing mode may be configured by the user, and numerous other configurable or hard-codable aspects will be apparent in light of this disclosure. Note that in some embodiments the content information viewing mode may be visually and/or aurally demonstrated or otherwise confirmed to the user via animations and/or sound effects. Such animations and sound effects may be used to provide clarity to the function being performed or otherwise enhance the user experience. In some embodiments, such animations and sound effects may be user-configurable, while in other embodiments they are hard-coded.

Figure 2A:
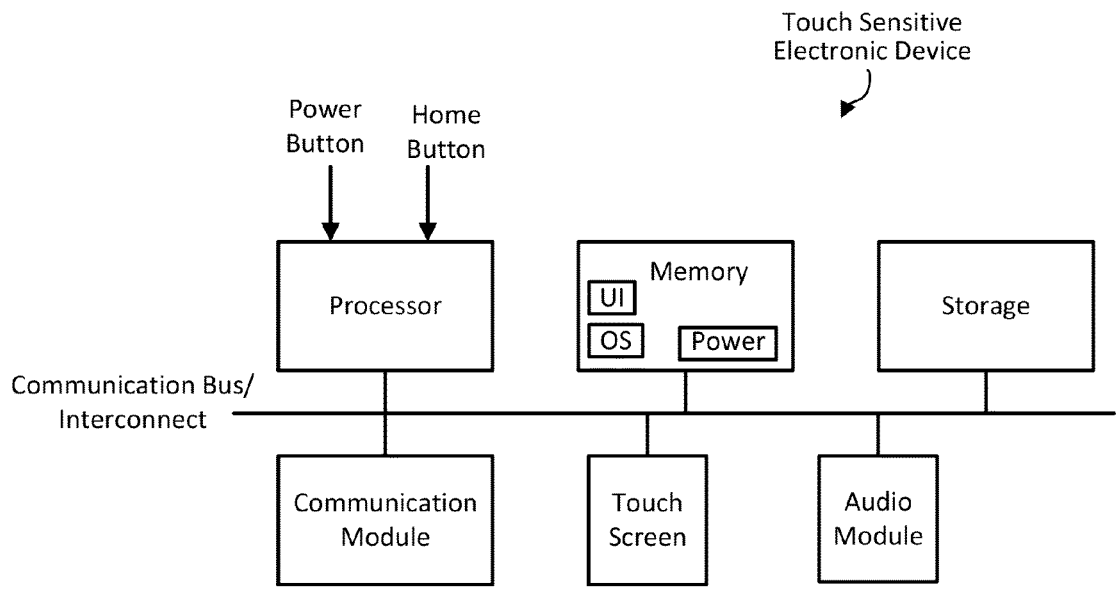
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the touch screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a content information viewing mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor and laptop and desktop computer applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The UI module can be, for example, based on touch-screen technology and the various example screen shots and use-case scenarios shown in FIGS. 1a, 1c-d, 3a-d, 4a-d, and 5a-d, and in conjunction with the content information viewing methodologies demonstrated in FIG. 6, which will be discussed in turn. The audio module can be configured to speak or otherwise aurally present, for example, a digital content sample, a selected eBook, or other textual content, and/or to provide verbal and/or other sound-based cues and prompts to guide the content information viewing mode, as will be appreciated in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
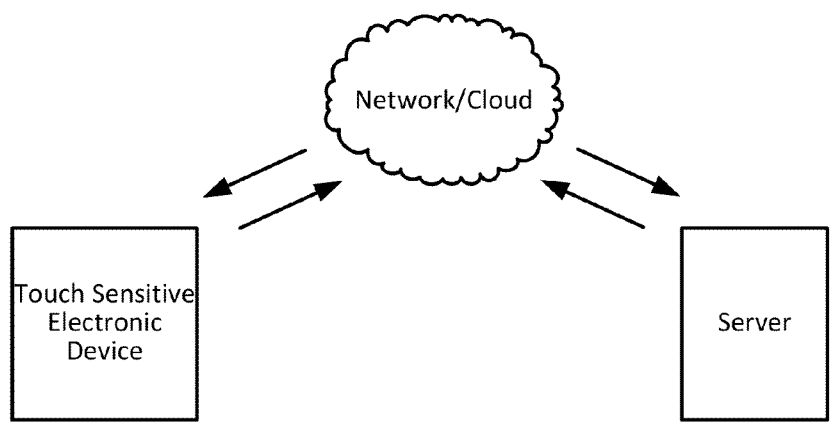
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a content information viewing mode as provided herein to the touch screen device (e.g., via JavaScript or other browser based technology). In other embodiments, portions of the content information viewing methodology can be executed on the server and other portions of the methodology can be executed on the device. Numerous server-side/client-side execution schemes can be implemented to facilitate a content information viewing mode in accordance with an embodiment, as will be apparent in light of this disclosure.

Content Information Viewing/Editing Mode Examples

Figure 3A:
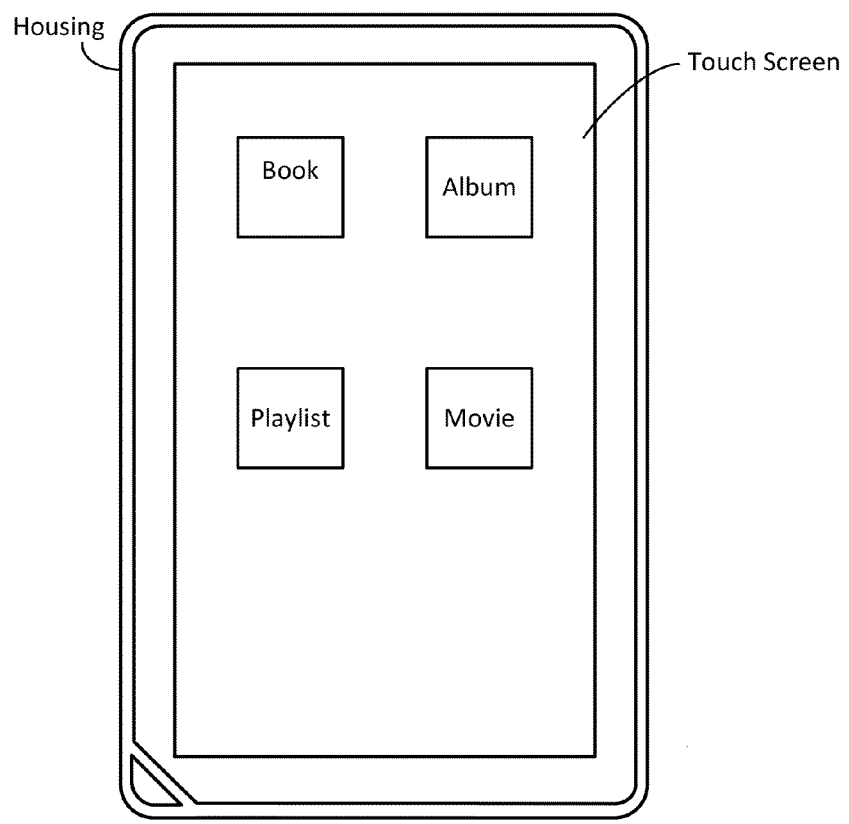
FIGS. 3a-d illustrate an example content information viewing mode of an electronic touch screen device, in accordance with an embodiment of the present invention.
Figure 3B:
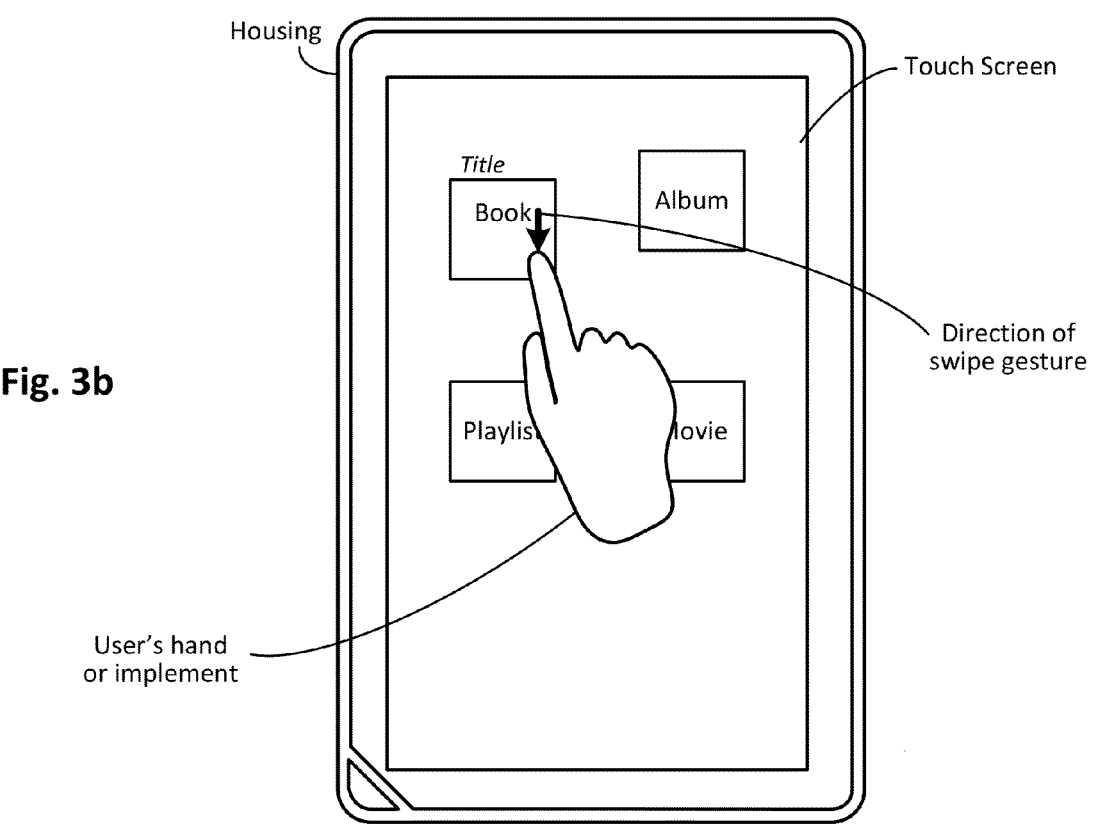

FIGS. 3a-d collectively illustrate an example content information viewing mode that can be applied to a touch sensitive display of an electronic device, in accordance with an embodiment of the present invention. As can be seen in FIG. 3a, the device housing surrounds the touch screen of the device, and the device is displaying a number of digital content items, including a book, an album, a playlist, and a movie. The user can interact with the touch screen with fingers or any other suitable implement, and a content information viewing mode may be invoked with an information viewing gesture, which may be detected based on the type and location of the gesture on the touch screen display, in some embodiments. In this particular embodiment, the information viewing gesture is configured as a single-contact downward swipe gesture. As will be appreciated, the information viewing gesture may be oriented in any desired direction and may be configured by the user (e.g., using the configuration sub-menu of FIG. 1d) or hard-coded. In the particular example shown in FIG. 3b, the user is performing a downward swipe gesture over the book icon, which moves the content icon downward and reveals content information. In this specific example, the book's title is shown once the content icon is moved downward. In some embodiments, the content icon may be a thumbnail image, a file icon, a folder icon, or other graphical representation suitable for a given digital content item, and may be accompanied by a textual description of the content (e.g., file name, folder name, file type, date of last modification, file size, etc.). The content information being displayed may include, for example, a book title, file name, author name, artist name, album name, number of annotations, grade, new content notification, new message, upcoming event notification, album art, thumbnail image, file type, folder name, or number of files saved within a folder, just to name a few.

Figure 3C:
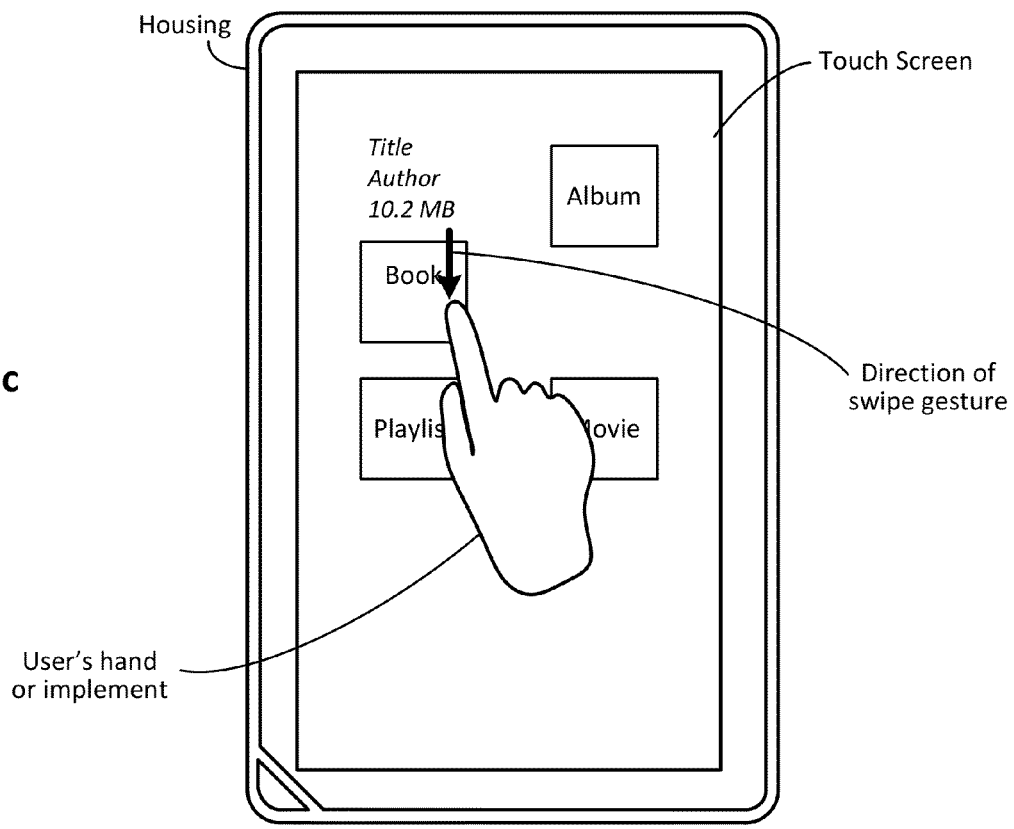
Figure 3D:
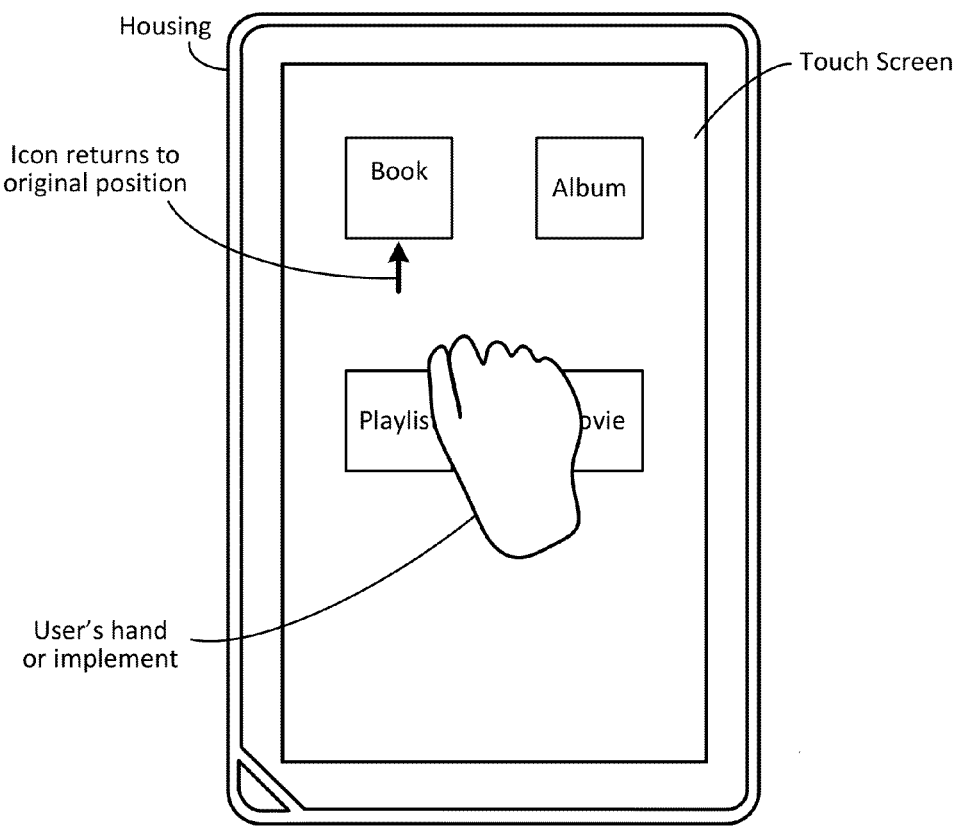

As can be seen in the example shown in FIG. 3c, more of the book's information is revealed when the user continues performing the downward swipe gesture. In this specific example, the book title, author, and file size are now displayed to the user after moving more of the book icon. As can be further seen in the example shown in FIG. 3d, if the user removes their hand from the touch screen display or otherwise stops performing the downward swipe gesture, the book icon relocates to its original position on the touch screen. In such an embodiment, when the book icon relocates to its original position, the content information that had been revealed is no longer visible, as it has been covered again by the book icon. In some embodiments, the relocation of the icon back to the original position may be accompanied by a suitable animation, such as one that shows the icon flying back into position.

Figure 4A:
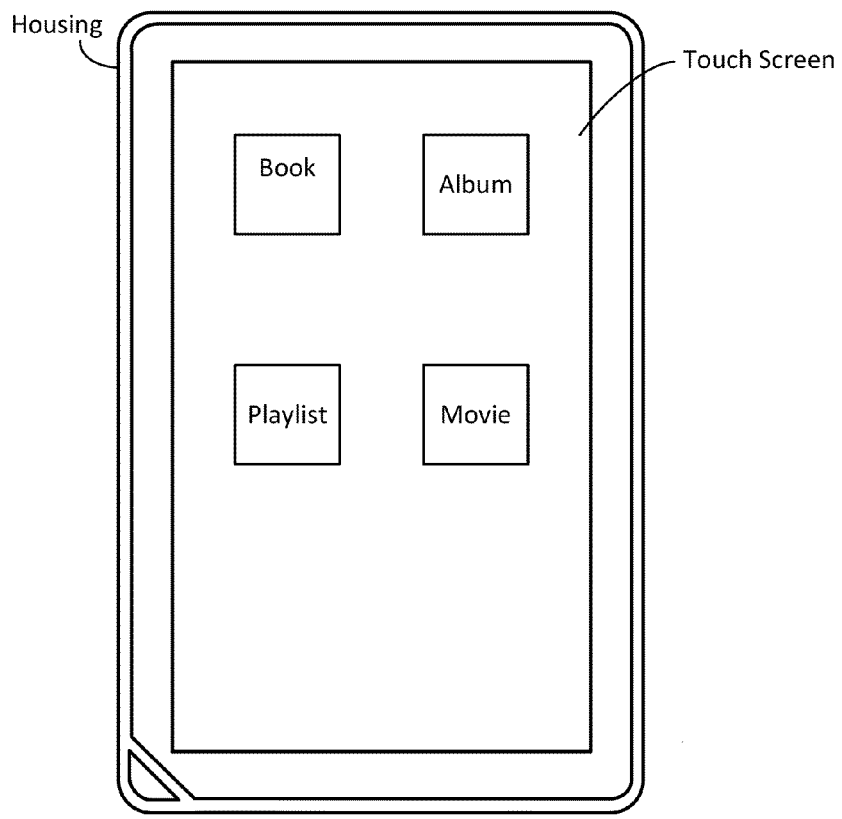
FIGS. 4a-d illustrate an example content information viewing mode of an electronic touch screen device, in accordance with another embodiment of the present invention.
Figure 4B:
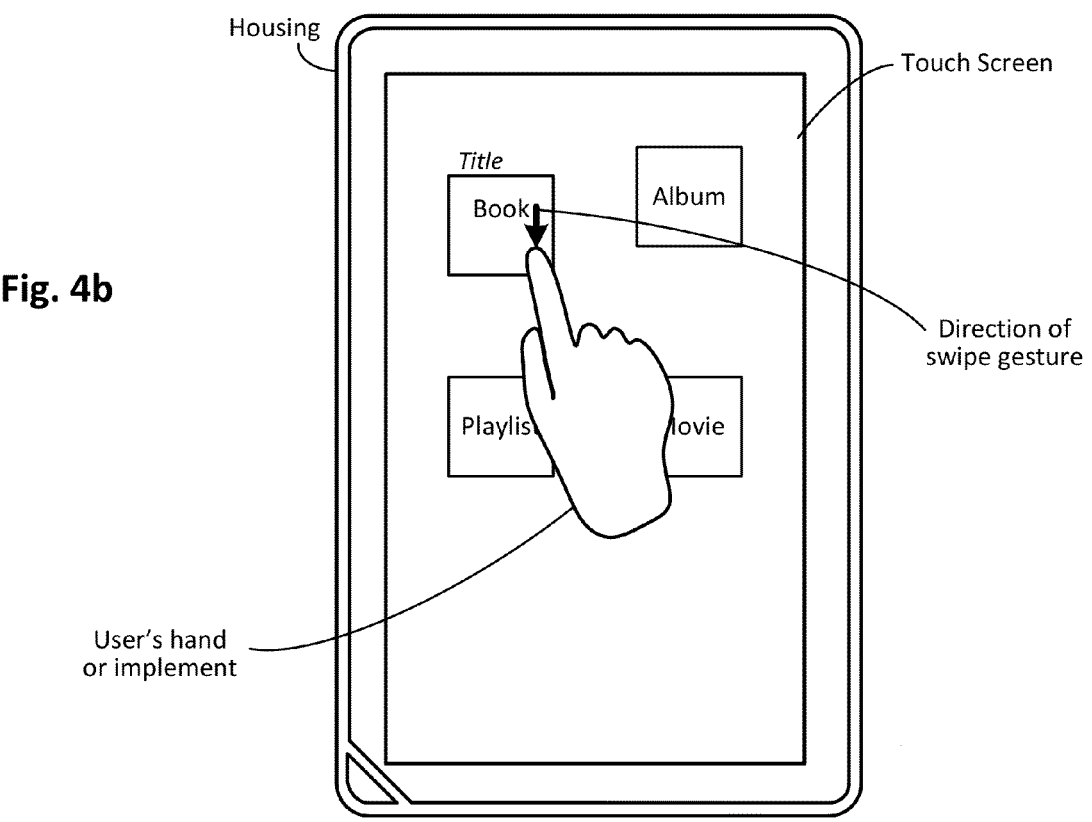

FIGS. 4a-d collectively illustrate an example content information viewing mode that can be applied to a touch sensitive display of an electronic device, in accordance with another embodiment of the present invention. As can be seen in FIG. 4a, the device housing surrounds the touch screen of the device, and the device is displaying a number of digital content items, including a book, an album, a playlist, and a movie. The user can interact with the touch screen with fingers or any other suitable implement, and a content information viewing mode may be invoked with an information viewing gesture, which may be detected based on the type and location of the gesture on the touch screen display, in some embodiments. In this particular embodiment, the information viewing gesture is configured as a single-contact downward swipe gesture. As previously mentioned, the information viewing gesture may be oriented in any desired direction and may be configured by the user or hard-coded. In the particular example shown in FIG. 4b, the user is performing a downward swipe gesture over the book icon, which moves the content icon downward and reveals content information. In this specific example, the book's title is shown once the content icon is moved downward.

Figure 4C:
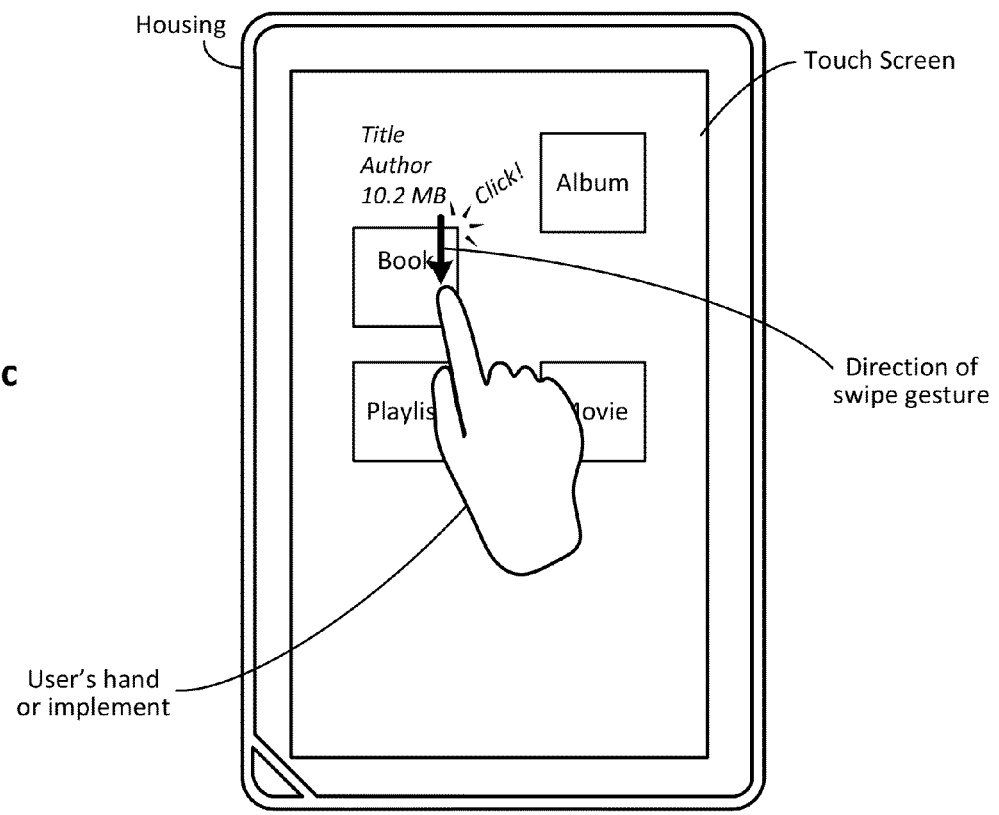
Figure 4D:
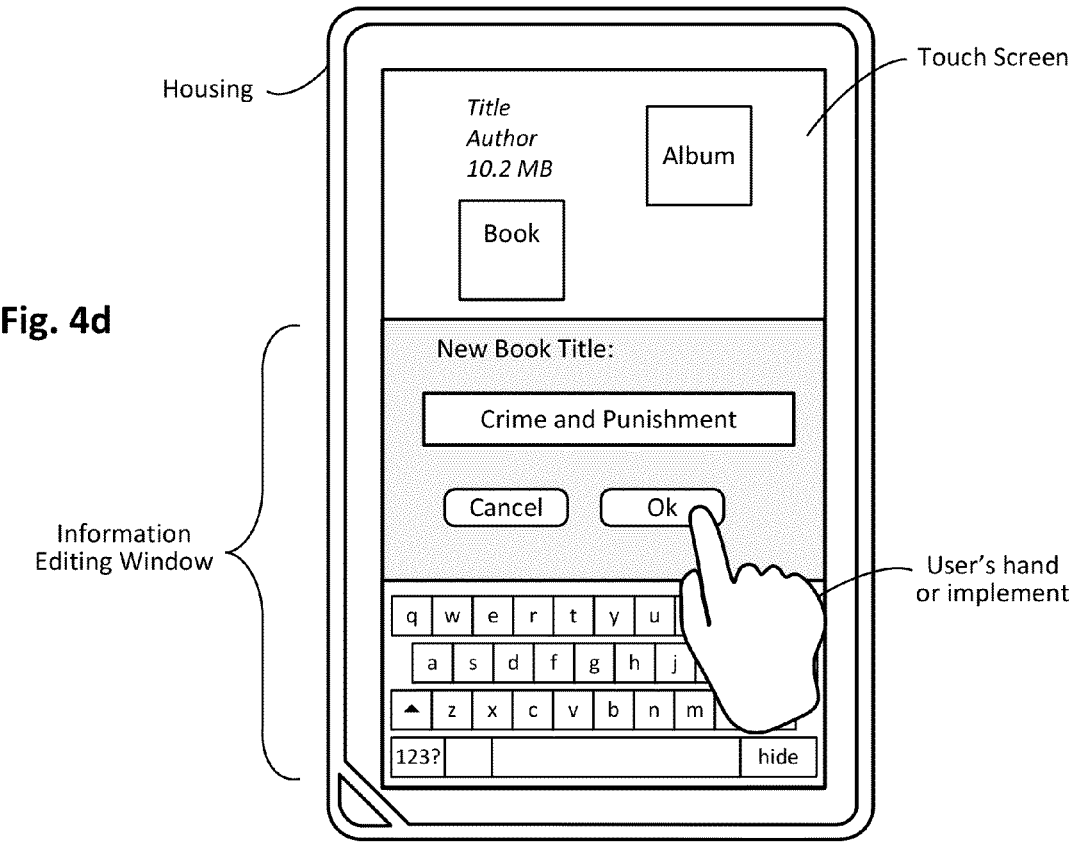

As can be seen in the example shown in FIG. 4c, more of the book's information is revealed when the user continues performing the downward swipe gesture, and once the book icon has been moved past the icon's original footprint the user is allowed to edit the newly visible content information. In this specific example, the book title, author name, and file size are now displayed to the user, and the user may edit some or all of the newly visible information. As discussed above, in some embodiments the information editing feature may be activated once the content icon has been moved past the midpoint of the icon's original footprint, or past some other movement limit. As can further be seen in FIG. 4c, an editing indicator alerts the user that the newly visible information may now be edited. In this specific example, the editing indicator is a "click" graphic accompanied by a sound effect that is performed once the content icon has been sufficiently moved. As can be further seen in the example shown in FIG. 4d, once the editing indicator has been performed, an information editing window is displayed to the user allowing the user to edit the book's information. In this particular embodiment, the user may rename the book using a virtual keyboard and either confirm the new name or cancel the editing function by selecting the appropriate UI control feature. Other embodiments may allow the user access to the edit window via a mouse click into the editable field, followed by any necessary typing with a physical keyboard.

Figure 5A:
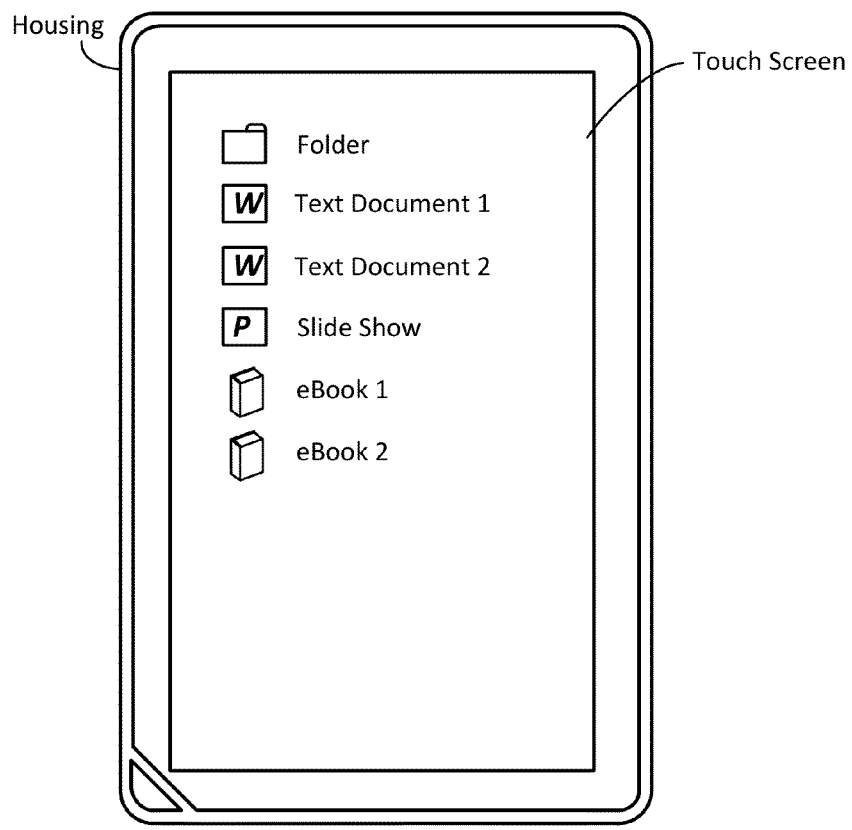
FIGS. 5a-d illustrate an example content information viewing mode of an electronic touch screen device, in accordance with another embodiment of the present invention.
Figure 5B:
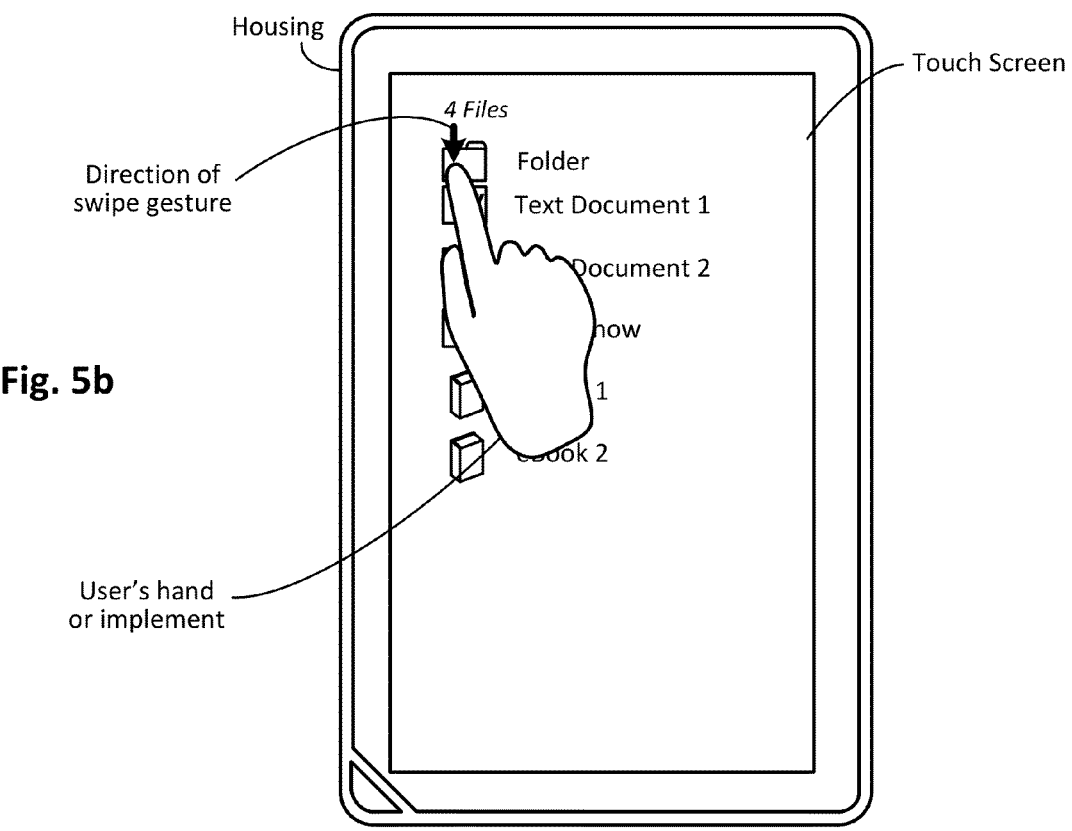

FIGS. 5a-d collectively illustrate an example content information viewing mode that can be applied to a touch sensitive display of an electronic device, in accordance with another embodiment of the present invention. As can be seen in FIG. 5a, the device housing surrounds the touch screen of the device, and the device is displaying a number of digital content items including a folder, two text documents, a slide show, and two eBooks. In this example embodiment, each content item is displayed as an icon accompanied by the item's name. The user can interact with the touch screen with fingers or any other suitable implement, and a content information viewing mode may be invoked with an information viewing gesture, which may be detected based on the type and location of the gesture on the touch screen display, in some embodiments. In this particular embodiment, the information viewing gesture is configured as a single-contact downward swipe gesture performed over the content icon or the content name. As previously mentioned, the information viewing gesture may be oriented in any desired direction and may be configured by the user or hard-coded. In the particular example shown in FIG. 5b, the user is performing a downward swipe gesture over the folder icon, which moves the folder icon and name downward and reveals information associated with the folder. In this specific example, because the file name is already visible to the user, the number of files within the selected folder is shown once the folder icon is moved downward and this particular folder includes four files.

Figure 5C:
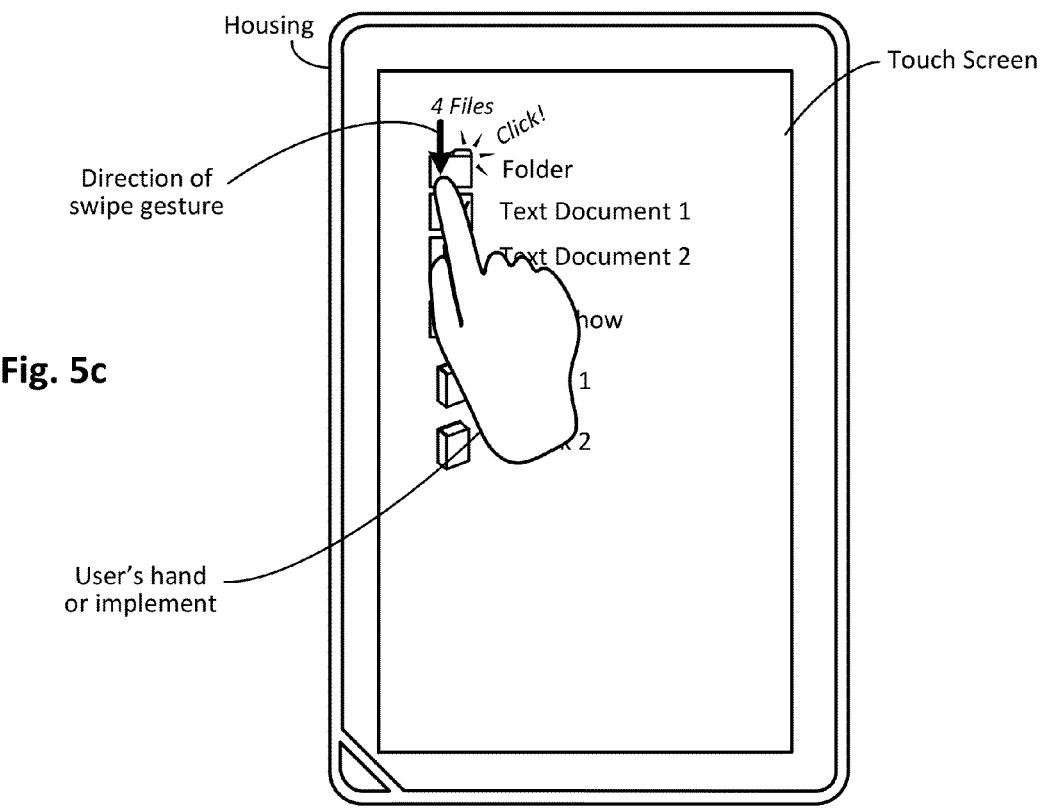
Figure 5D:
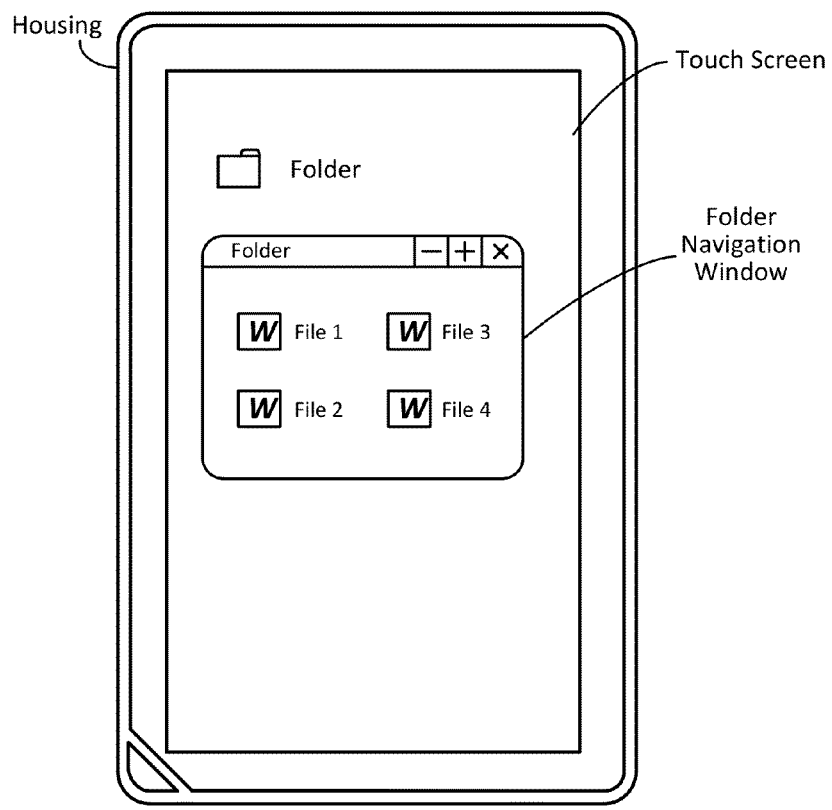

As can be seen in the example shown in FIG. 5c, the folder icon and name continue to be moved downward as the user continues performing the downward swipe gesture. In this example, because of the increased movement of the folder icon, the adjacent icon and text for text document 1 must be slightly displaced downward as compared to its position in FIG. 5b. As can be further seen in FIG. 5c, once the folder icon has been moved past a certain point, an editing indication alerts the user that the information editing feature of the content information viewing mode is now available. As discussed above, in some embodiments the information editing feature may be activated once the content icon has been moved past the midpoint of the icon's original footprint, or past some other displacement limit. In this particular example, the editing indication is a "click" graphic with text accompanied by a sound effect that is performed once the content icon has been sufficiently moved. In this particular example, editing the folder information opens the folder in a navigation window allowing the user to view and edit the folder contents, as shown in FIG. 5d. In some embodiments, the user may rename the folder and/or the files contained within the folder.

Note that the movement of the target icon for purposes of invoking the content viewing/editing features can be associated with a maximum moving distance as well, so as to distinguish from when the user wishes to simply move the icon to a different location on the display or scroll through content displayed on the screen. For instance, if the user moves the icon 5-10 mm, then the viewing mode is engaged; if the user moves the icon 11-20 mm then the editing mode is engaged; and if the user moves the icon more than 20 mm, then the icon moving function is engaged. Numerous other such movement schemes will be apparent in light of this disclosure.

Methodology

Figure 6:
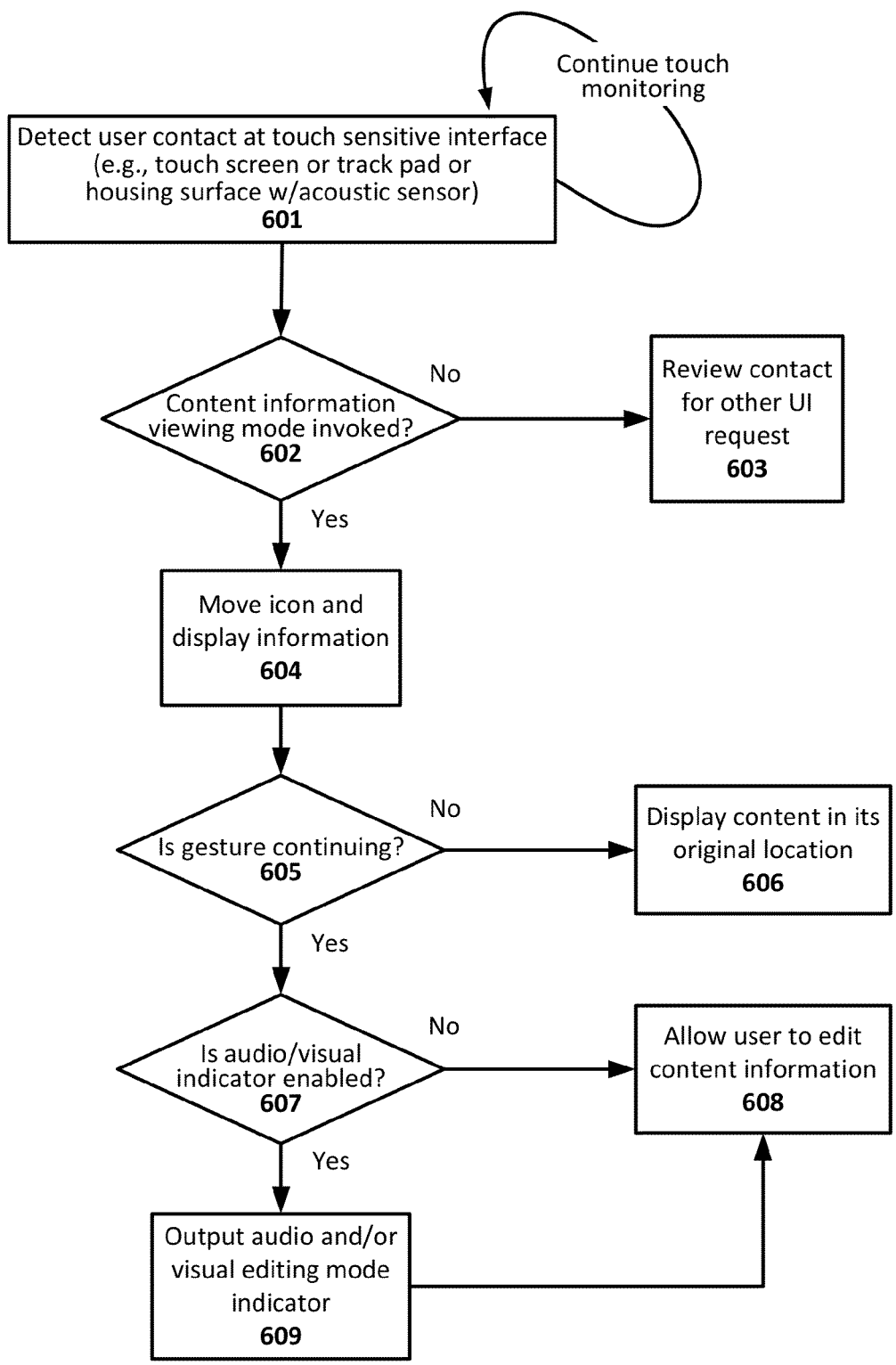
FIG. 6 illustrates a method for providing a content information viewing mode in an electronic touch screen device, in accordance with an embodiment of the present invention.

FIG. 6 illustrates a method for providing a content information viewing mode in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the content information viewing/editing mode can be implemented in software, hardware, firmware, or any combination thereof, as will be appreciated in light of this disclosure.

As can be seen in this example embodiment, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a content information viewing mode as variously described herein, as will be appreciated in light of this disclosure.

In this example case, the method includes detecting 601 a user contact on the touch sensitive interface. As described above, the contact may be performed in any suitable manner using a stylus, the user's finger, or any other suitable implement, and it may be performed on a touch screen surface, a track pad, acoustic sensor, or other touch sensitive surface. In other embodiments, the user input may be, for example, a mouse-based click-hold-and-drag operation, or any other user interface indication of an icon being moved. The user contact monitoring is essentially continuous. Once a user contact (or other selection method) has been detected, the method may continue with determining 602 whether the content information viewing mode has been invoked (e.g., based on the type of gesture and/or location of the gesture on the touch screen display, as previously explained). In some embodiments, the information viewing gesture may be a swipe gesture or other touch screen gesture performed over a content icon which moves the icon. If the content information viewing mode is not invoked, the user contact may be reviewed 603 for other UI requests. For example, a swipe gesture performed over a content icon that moves the icon outside of the maximum distance associated with the information viewing/editing mode may simply move the content icon's location without engaging the information viewing/editing mode. If, however, the content information viewing mode is invoked, the method may continue with moving 604 the content icon and displaying content information. As discussed above, in one embodiment, displaying content information may include revealing the content information from behind the content icon as the icon is being moved by a single-contact swipe gesture. The content icon may be, for example, a thumbnail image, a file icon, or a folder icon and may be accompanied by a textual description of the content (e.g., folder name, file name, file type, date of last modification, file size, etc.). In some embodiments, the content information being displayed may include a book title, file name, folder name, author name, artist name, album name, number of annotations, grade, new content notification, new message, upcoming event notification, album art, thumbnail image, file type, or number of files saved within a folder, just to name a few.

The method may continue with determining 605 whether the gesture is continuing. If the gesture does not continue, meaning that the user has ceased contact with the touch screen display, the method may continue with displaying 606 the content in its original location. If the gesture does continue, meaning that the content icon is being further moved, the method may continue with determining 607 whether an audio and/or visual editing indicator is enabled. As discussed above, the editing indicator may include, for example, a click or locking noise, a locking graphic, a haptic feedback signal, an animation including graphics and/or text, or any other sound or video effect used to indicate that the gesture has activated the information editing feature of the content information viewing mode. If no audio and/or visual indicator is enabled, the method may continue with allowing 608 the user to edit the newly displayed content information. An information editing window or navigation window may be displayed to the user, along with a virtual keyboard, so that the user may edit the content information, in some embodiments. If an audio and/or visual indicator is enabled, the method may continue with outputting 609 the appropriate graphic, animation, and/or sound effect indicating that the user may now edit the content information. As discussed above, the indicator may include, for example, a click or locking noise, a locking graphic, a haptic feedback signal, an animation including graphics and/or text, or any other suitable sound or video effect. Such indicators may be user configurable or hardcoded, in various embodiments. The method may then continue with allowing 608 the user to edit the newly displayed content information, as discussed above.

Numerous variations and embodiments will be apparent in light of this disclosure. One example embodiment of the present invention provides a device including a touch screen display for displaying digital content to a user and allowing user input. The device also includes a user interface including a content information viewing mode, wherein in response to an information viewing command performed over a content icon representing a digital content item, the content information viewing mode is configured to move the content icon and display undisplayed information about the digital content item. In some cases, the digital content item includes at least one of a digital catalogue, magazine, comic, eBook, text document file, rich media file, graphic file, image file, audio file, video file, and/or folder. In some cases, the information about the digital content includes at least one of file name, eBook title, author, file size, number of annotations, grade, new content notification, new message, upcoming event notification, folder name, file type, date of last modification, artist name, album name, album art, thumbnail image, number of files saved within a folder, UPC, EAN, and/or ISBN. In some cases, the information viewing command includes a single-contact swipe gesture. In some cases, the content information viewing mode is further configured to allow editing of the newly displayed content information. In some cases, the content information viewing mode is further configured to allow editing of the newly displayed information. In some cases, the content information viewing mode is further configured to output a visual and/or audio indicator in response to the content icon being moved a distance or direction indicative of editability being engaged. In some cases, the digital content item is a folder represented by a folder icon including one or more additional digital content items, and the content information viewing mode is further configured to display and allow editing of the folder contents in response to the folder icon being moved a distance or direction indicative of an edit mode being engaged. In some cases, the content information viewing mode is further configured to displace at least one adjacent content icon in response to moving the content icon. In some cases, the amount of information about the digital content icon being displayed depends on the amount the content icon is moved.

Another example embodiment of the present invention provides a mobile computing system including a processor and a touch screen display for displaying content to a user and allowing user input. The system also includes a user interface executable on the processor and including a content information viewing mode, wherein in response to an information viewing command performed over a content icon representing a digital content item, the content information viewing mode is configured to move the content icon and display undisplayed information about the digital content item. In some cases, the content information viewing mode is further configured to allow editing of the newly displayed content information. In some such cases, the content information viewing mode is further configured to output a visual and/or audio indicator in response to the content icon being moved a distance or direction indicative of editability being desired. In some cases, the content information viewing mode is further configured to allow editing of the newly displayed information in response to moving the content icon at least halfway outside of its original footprint. In some cases, the amount of information about the digital content icon being displayed depends on the amount the content icon is moved. In some cases, the content information viewing mode is further configured to displace at least one adjacent content icon in response to moving the content icon. In some cases, the information viewing command includes a single-contact swipe gesture.

Another example embodiment of the present invention provides a computer program product including a plurality of instructions non-transiently encoded thereon and executable by one or more processors to carry out a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive a user input associated with a content icon displayed on the electronic device and representing an item of digital content; move the content icon from its original location in response to the user input; and display content information about the item of digital content in the original location previously occupied by the content icon. In some cases, the process further includes display an information editing window allowing a user to edit the newly displayed content information. In some such cases, the process further includes output an audio and/or visual indicator in response to the content icon being moved so as to indicate editability of the newly displayed content information is desired.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
a touch screen display for displaying digital content to a user and allowing user input; and
a user interface including a content information viewing mode configured to:
receive an information viewing command performed over a content icon representing a digital content item;
responsive to the received information viewing command, move the content icon in a vertical direction, thereby displacing only vertically adjacent content icons in the vertical direction, and thereby exposing a portion of the touch screen display previously occupied by the icon prior to the move;
display previously undisplayed information about the digital content item in the exposed portion of the touch screen display; and
allow editing of the previously undisplayed information in response to moving the content icon at least halfway outside of its original footprint.

2. The device of claim 1 wherein the digital content item comprises at least one of a digital catalogue, magazine, comic, eBook, text document file, rich media file, graphic file, image file, audio file, video file, and/or folder.

3. The device of claim 1 wherein the information about the digital content comprises at least one of file name, eBook title, author, file size, number of annotations, grade, new content notification, new message, upcoming event notification, folder name, file type, date of last modification, artist name, album name, album art, thumbnail image, number of files saved within a folder, UPC, EAN, and/or ISBN.

4. The device of claim 1 wherein the information viewing command comprises a dragging gesture, and wherein the content information viewing mode is further configured to return the content icon to the exposed portion of the touch screen display upon release of the dragging gesture.

5. The device of claim 1 wherein the content information viewing mode is further configured to cause issuance of an audible sound in response to the content icon being moved at least halfway outside of its original footprint, thus indicating the allowance of editing of the previously undisplayed information.

6. The device of claim 1 wherein the content icon remains displayed while the previously undisplayed information is displayed.

7. The device of claim 1 wherein the content information viewing mode is further configured to output at least one of a visual indicator and a haptic indicator in response to the content icon being moved at least halfway outside of its original footprint, thus indicating the allowance of editing the previously undisplayed information being engaged.

8. The device of claim 1 wherein the digital content item is a folder represented by a folder icon including one or more additional digital content items, and the content information viewing mode is further configured to display and allow editing of the folder contents in response to the folder icon being moved a distance or direction indicative of an edit mode being engaged.

9. The device of claim 1 wherein the content information viewing mode is further configured to displace at least one adjacent content icon in response to moving the content icon.

10. The device of claim 1 wherein an amount of information about the digital content icon being displayed is determined by a size of the exposed portion of the touch screen display.

11. A mobile computing system, comprising:
a processor and a touch screen display for displaying content to a user and allowing user input; and
a user interface executable on the processor and including a content information viewing mode configured to:
receive an information viewing command performed over a content icon representing a digital content item;
responsive to the received information viewing command, move the content icon in a vertical direction, thereby displacing only vertically adjacent content icons in the vertical direction, and thereby exposing a portion of the touch screen display previously occupied by the icon prior to the move;
display previously undisplayed information about the digital content item in the exposed portion of the touch screen display; and
allow editing of the previously undisplayed information in response to moving the content icon at least halfway outside of its original footprint.

12. The system of claim 11 wherein the content icon remains displayed while the previously undisplayed content information is displayed.

13. The system of claim 11 wherein the content information viewing mode is further configured to output an editing indicator intended to alert the user when the icon has been moved at least halfway outside of its original footprint so as to allow editing of the previously undisplayed information, the editing indicator including a click sound, a locking noise, a locking graphic, a haptic feedback signal, and an animation including at least one of graphics and text, thereby indicating engagement of the information editing function.

14. The system of claim 11 wherein the amount of information about the digital content icon being displayed depends on the amount the content icon is moved.

15. The system of claim 11 wherein the content information viewing mode is further configured to displace at least one adjacent content icon in response to moving the content icon.

16. The system of claim 11 wherein the information viewing command comprises a dragging gesture, and wherein the content information viewing mode is further configured to return the content icon to the exposed portion of the touch screen display upon release of the dragging gesture.

17. A computer program product wherein the computer program product comprises at least one non-transitory computer-readable medium that includes instructions that when executed by one or more processors cause a process to be carried out, the process comprising:
receive a user input associated with a content icon displayed on the electronic device and representing an item of digital content;
move the content icon from its original location in response to the user input in a vertical direction, thereby displacing only vertically adjacent content icons in the vertical direction, and thereby exposing a portion of a touch screen display previously occupied by the icon prior to the move; and display previously undisplayed content information about the item of digital content in the exposed portion of the original location previously occupied by the content icon; and allow editing of the previously undisplayed information in response to moving the content icon at least halfway outside of its original footprint.

18. The computer program product of claim 17, the process further comprising:

display an information editing window allowing a user to edit the previously undisplayed content information.

19. The computer program product of claim 18, the process further comprising:

output at least one of an audio indicator and a visual indicator in response to the content icon being moved at least halfway outside of its original footprint, so as to indicate the allowance of editing the previously undisplayed content information.

20. The device of claim 1, wherein the previously undisplayed information is displayed only within boundaries defined by the portion of the touch screen display exposed by moving the content icon.

* * * * *